US012633137B2

(12) United States Patent
Wakayama

(10) Patent No.: US 12,633,137 B2
(45) Date of Patent: May 19, 2026

(54) MOVING BODY CONTROL DEVICE, MOVING BODY CONTROL METHOD, AND STORAGE MEDIUM USING TRAINED MODELS ADAPTED FOR MULTIPLE TYPES OF ROADS

(71) Applicant: HONDA MOTOR CO., LTD., Tokyo (JP)

(72) Inventor: Ryoji Wakayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 344 days.

(21) Appl. No.: 18/234,398

(22) Filed: Aug. 16, 2023

(65) Prior Publication Data

US 2024/0071103 A1 Feb. 29, 2024

(30) Foreign Application Priority Data

Aug. 23, 2022 (JP) ................................ 2022-132444

(51) Int. Cl.
*G06V 20/56* (2022.01)
*G06V 10/70* (2022.01)

(52) U.S. Cl.
CPC ............ *G06V 20/588* (2022.01); *G06V 10/70* (2022.01)

(58) Field of Classification Search
None
See application file for complete search history.

(56) References Cited

U.S. PATENT DOCUMENTS

| | | | | |
|---|---|---|---|---|
| 12,330,639 | B1 * | 6/2025 | Ferencz | ................ B60W 10/20 |
| 2019/0221115 | A1 * | 7/2019 | Masuike | ................ G08G 1/07 |
| 2021/0132607 | A1 * | 5/2021 | Maeng | ................ G06N 3/0464 |
| 2021/0300362 | A1 * | 9/2021 | Yasui | .................... B60W 10/20 |
| 2022/0169245 | A1 * | 6/2022 | Hieida | .................... G08G 1/162 |
| 2022/0274630 | A1 * | 9/2022 | Koike | .................... G06V 20/56 |

FOREIGN PATENT DOCUMENTS

| | | | |
|---|---|---|---|
| JP | 2021-012709 | 2/2021 | |
| JP | 2021-157403 | 10/2021 | |
| JP | 2022-535351 | 8/2022 | |
| WO | 2020/240274 | 12/2020 | |
| WO | WO-2020240274 A1 * | 12/2020 | ......... G01C 21/3446 |

OTHER PUBLICATIONS

Japanese Notice Of Allowance for Japanese Patent Application No. 2023-115503 mailed Nov. 26, 2024.

* cited by examiner

*Primary Examiner* — Andrew H Lam

(74) *Attorney, Agent, or Firm* — Amin, Turocy & Watson, LLP

(57) ABSTRACT

Provided is an image recognition device configured to execute using a first trained model, which is trained to receive input of an image including a road surface to output areas estimated to have road surfaces with the same attribute in the image as one area, and a second trained model, which is trained to receive input of an image including the road surface as an input to output boundaries of a plurality of the areas in the image, and recognizing a travelable area in which a moving body is capable of traveling on the basis of the areas and the boundaries obtained by inputting an image including a road surface captured by a camera mounted in the moving body to the first trained model and the second trained model.

8 Claims, 8 Drawing Sheets

MOVING BODY CONTROL DEVICE, MOVING BODY CONTROL METHOD, AND STORAGE MEDIUM USING TRAINED MODELS ADAPTED FOR MULTIPLE TYPES OF ROADS

CROSS-REFERENCE TO RELATED APPLICATION

Priority is claimed on Japanese Patent Application No. 2022-132444, filed Aug. 23, 2022, and Japanese Patent Application No. 2023-115503, filed on Jul. 13, 2023, the content of which is incorporated herein by reference.

BACKGROUND

Field of the Invention

The present invention relates to an image recognition device, an image recognition method, and a program.

Description of Related Art

Technologies for recognizing a travelable area of a vehicle are conventionally known. For example, Japanese Unexamined Patent Application, First Publication No. 2021-12709 discloses a technology for recognizing the travelable area of a vehicle by analyzing at least one of a plurality of images of a surrounding environment of the vehicle.

The technology described in Japanese Unexamined Patent Application, First Publication No. 2021-12709 uses a trained system (a machine learning or deep learning system) to recognize the travelable area of a vehicle by analyzing images. Conventionally, in an analysis using such a trained model, it has been necessary to appropriately select a trained model trained on a premise that the vehicle will travel only on a roadway, or a trained model trained on a premise that the vehicle will travel on a roadway and a sidewalk in advance. As a result, it has taken much effort to change which trained model is used depending on what type of a road the moving body travels on.

SUMMARY

The present invention has been made in consideration of such circumstances, and one of the objects is to provide an image recognition device, an image recognition method, and a program that can recognize a drivable area without changing a trained model according to a type of a road on which a mobile object travels.

The image recognition device, the image recognition method, and the program according to this invention have adopted the following configurations.

(1): An image recognition device according to one aspect of the present invention includes a storage medium configured to store computer-readable instructions; and a processor that is connected to the storage medium, in which the processor executes the computer-readable instructions, thereby using a first trained model, which is trained to receive input of an image including a road surface to output areas estimated to have road surfaces with the same attribute in the image as one area, and a second trained model, which is trained to receive input of an image including the road surface as an input to output boundaries of a plurality of the areas in the image, and recognizing a travelable area in which a moving body is capable of traveling on the basis of the areas and the boundaries obtained by inputting an image including a road surface captured by a camera mounted in the moving body to the first trained model and the second trained model.

(2): In the aspect of (1) described above, the processor may recognize the area including a current location of the moving body as the travelable area.

(3): In the aspect of (1) described above, the processor may receive setting of a destination of the moving body, and the processor, when the area separated from the moving body is present on a path from a current location of the moving body to the destination, may recognize the area and the boundary present between the area and the moving body as the travelable area.

(4): In the aspect of (1) described above, the processor may recognize the area including the current location of the moving body as the travelable area, and the processor may receive the setting of a destination of the moving body, the processor, when a second area different from a first area including the current location of the moving body is present on the path from the current location of the moving body to the destination, may recognize the first area, the second area, and the boundary present between the first area and the second area as the travelable area, and the first area and the second area may be output by the first trained model, respectively.

(5): In the aspect of (1) described above, when the moving body crosses the boundary and moves to a different area from the area including the current location of the moving body, the processor may recognize the different area as the travelable area.

(6): In the aspect of any one of (1) to (4) described above, the first trained model may be a trained model generated by unsupervised training, and the second trained model may be a trained model generated by supervised training.

(7): An image recognition method to be executed by a computer according to another aspect of the present invention includes using a first trained model, which is trained to receive input of an image including a road surface to output areas estimated to have road surfaces with the same attribute in the image as one area, and a second trained model, which is trained to receive input of an image including the road surface as an input to output boundaries of a plurality of the areas in the image, and recognizing a travelable area in which a moving body is capable of traveling on the basis of the areas and the boundaries obtained by inputting an image including a road surface captured by a camera mounted in the moving body to the first trained model and the second trained model.

(8): A computer-readable non-transitory storage medium according to still another aspect of the present invention stores a program causing a computer to execute using a first trained model, which is trained to receive input of an image including a road surface to output areas estimated to have road surfaces with the same attribute in the image as one area, and a second trained model, which is trained to receive input of an image including the road surface as an input to output boundaries of a plurality of the areas in the image, and recognizing a travelable area in which a moving body is capable of traveling on the basis of the areas and the boundaries obtained by inputting an image including a road surface captured by a camera mounted in the moving body to the first trained model and the second trained model.

According to the aspects of (1) to (8), it is possible to recognize a travelable area without changing a trained model according to a type of a road on which a moving body travels.

DESCRIPTION OF EMBODIMENTS

Hereinafter, embodiments of an image recognition device, an image recognition method, and a program according to the present invention will be described with reference to the drawings. The image recognition device is mounted on a moving body. The moving body moves both on a roadway and in a predetermined area different from the roadway. The moving body is sometimes referred to as micro-mobility. An electric scooter is a type of micro-mobility. The predetermined area is, for example, a sidewalk. In addition, the predetermined area may be a part or all of a roadside strip, a bicycle lane, an open space, and the like, or may include all of a sidewalk, a roadside strip, a bicycle lane, an open space, and the like. In the following description, it is assumed that the predetermined area is a sidewalk. In the following description, a portion described as a "sidewalk" can be appropriately read as the "predetermined area."

Figure 1:
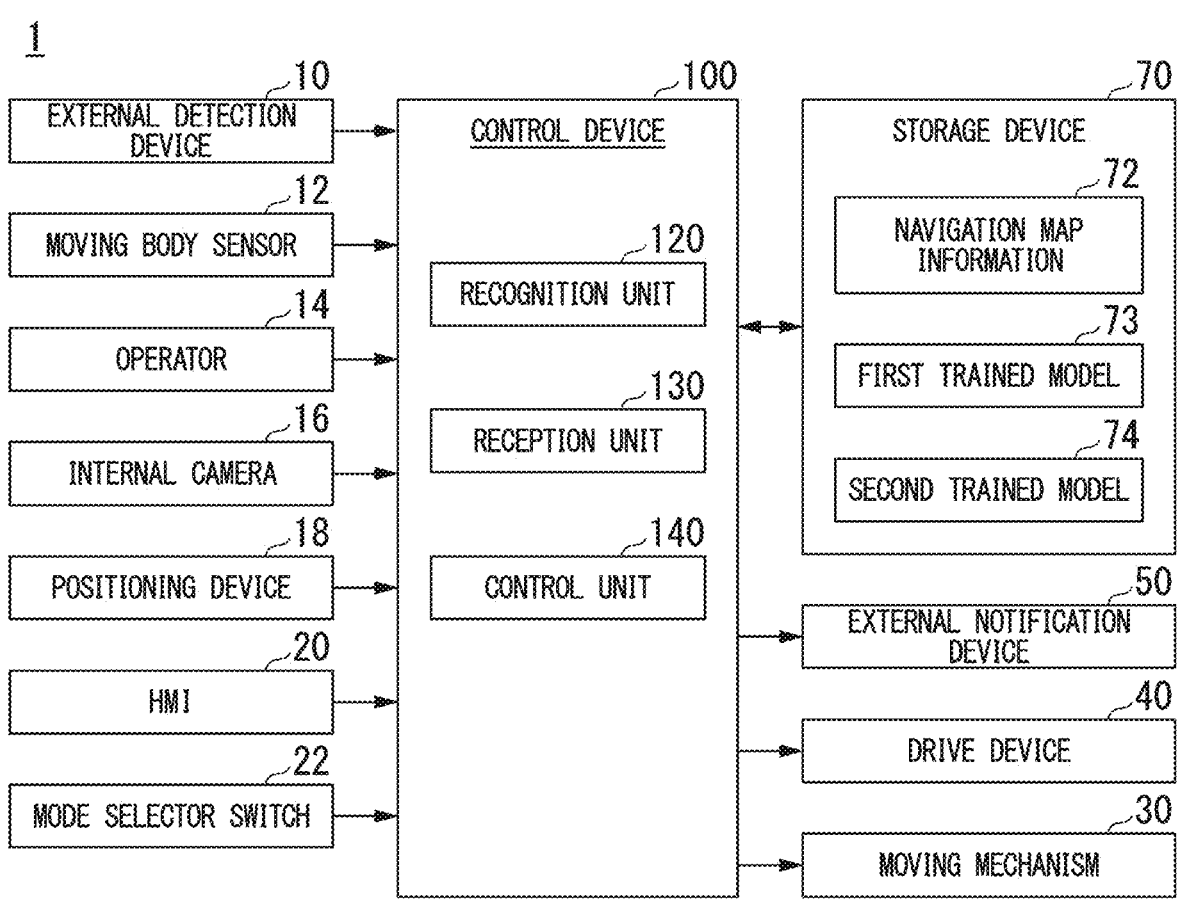
FIG. 1 is a diagram which shows an example of the configuration of a moving body and control device according to an embodiment.

FIG. 1 is a diagram which shows an example of a configuration of a moving body 1 and a control device 100 according to the embodiment. For example, an external detection device 10, a moving body sensor 12, an operator 14, an internal camera 16, a positioning device 18, a mode selector switch 22, a dial switch 24, a moving mechanism 30, a drive device 40, an external notification device 50, a storage device 70, and a control device 100 are mounted on the moving body 1. Note that some of these constituents that are not essential for realizing functions of the present invention may be omitted. The moving body is not limited to a vehicle, but may include a small mobility device that travels in parallel with a walking user to carry luggage or lead people. In addition, other moving bodies capable of other autonomous movement (for example, walking robots, and the like) may also be included.

The external detection device 10 is any of various types of devices whose detection range is set to a traveling direction of the moving body 1. The external detection device 10 includes an external camera, a radar device, a light detection and ranging (LIDAR), a sensor fusion device, and the like. The external detection device 10 outputs information (an image, object position, and the like) indicating a result of the detection to the control device 100.

The moving body sensor 12 includes, for example, a speed sensor, an acceleration sensor, a yaw rate (angular speed) sensor, an orientation sensor, and an operation amount detection sensor attached to an operator 14. The operator 14 includes, for example, an operator for instructing acceleration or deceleration (for example, an accelerator pedal or a brake pedal) and an operator for instructing steering (for example, a steering wheel). In this case, the moving body sensor 12 may include an accelerator opening sensor, a brake stepping amount sensor, a steering torque sensor, and the like. The moving body 1 may include an operator in a mode other than those described above (for example, a non-annular rotary operator, a joystick, a button, or the like) as the operator 14.

An internal camera 16 captures an image of at least a head of an occupant of the moving body 1 from the front. The internal camera 16 is a digital camera using an image-capturing device such as a charge coupled device (CCD) or complementary metal oxide semiconductor (CMOS). The internal camera 16 outputs captured images to the control device 100.

The positioning device 18 is a device that measures a position of the moving body 1. The positioning device 18 is, for example, a global navigation satellite system (GNSS) receiver that identifies the position of the moving body 1 on the basis of a signal received from GNSS satellites and outputs it as position information. Note that the position information of the moving body 1 may be estimated from a position of a Wi-Fi base station to which a communication device to be described below is connected.

The HMI 20 includes a display device, a speaker, a touch panel, a key, and the like. The occupant of the moving body 1 sets, for example, a destination of the moving body 1 via the HMI 20, and the control unit 140 to be described below causes the moving body 1 to travel to the set destination.

The mode selector switch 22 is a switch operated by the occupant. The mode selector switch 22 may be a mechanical switch or a graphical user interface (GUI) switch set on a touch panel of the HMI 20. The mode selector switch 22 receives, for example, an operation to switch the driving mode to any one of a mode A: an assist mode in which one of a steering operation and acceleration or deceleration control is performed by the occupant, and the other is automatically performed, which may include a mode A-1 in which the steering operation is performed by the occupant and the acceleration or deceleration control is automatically performed and a mode A-2 in which the acceleration or deceleration control is performed by the occupant and the steering operation is automatically performed, a mode B a manual driving mode in which the steering operation and the acceleration or deceleration control are performed by the occupant, and a mode C: an automated driving mode in which the steering operation and the acceleration or deceleration control are automatically performed.

The moving mechanism 30 is a mechanism for moving the moving body 1 on the road. The moving mechanism 30 is, for example, a wheel group including steering wheels and drive wheels. Moreover, the moving mechanism 30 may be legs for multi-legged walking.

The drive device 40 outputs force to the moving mechanism 30 to move the moving body 1. For example, the drive device 40 includes a motor that drives the drive wheels, a battery that stores electric power to be supplied to the motor, a steering device that adjusts a steering angle of the steered wheels, and the like. The drive device 40 may include an internal combustion engine, a fuel cell, or the like as drive force output means or power generation means. Moreover, the drive device 40 may further include a braking device using frictional force or air resistance.

The external notification device 50 is, for example, a lamp, a display device, a speaker, or the like, which is provided on an outer plate of the moving body 1 to notify the outside of the moving body 1 of information. The external notification device 50 performs different operations depending on whether the moving body 1 is moving on a sidewalk or a roadway. For example, the external notification device 50 is controlled so that the lamp is made to emit light when the moving body 1 is moving on the sidewalk, and the lamp is made not to emit light when the moving body 1 is moving on the roadway. A color of light emitted from this lamp is preferably a color specified by law. The external notification device 50 may also be controlled so that the lamp is made to emit green light when the moving body 1 is moving on the sidewalk, and the lamp is made to emit blue light when the moving body 1 is moving on the roadway. When the external notification device 50 is a display device, the external notification device 50 displays "traveling on the sidewalk" in a text or graphics when the moving body 1 is traveling on the sidewalk.

Figure 2:
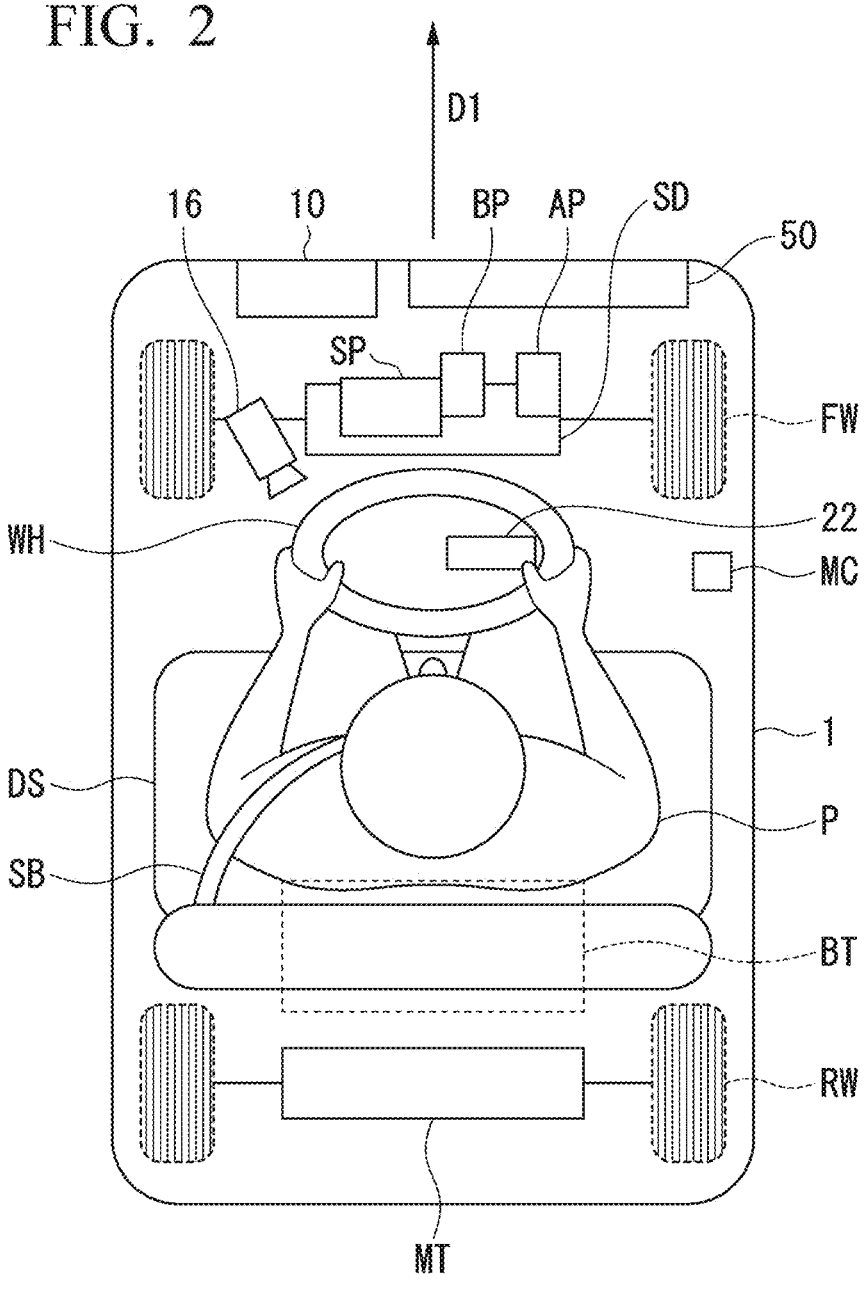
FIG. 2 is a perspective view of the moving body from above.

FIG. 2 is a perspective view of the moving body 1 as seen from above. In FIG. 2, FW is a steering wheel, RW is a drive wheel, SD is a steering device, MT is a motor, and BT is a battery. The steering device SD, the motor MT, and the battery BT are included in the drive device 40. In addition, AP is an accelerator pedal, BP is a brake pedal, WH is a steering wheel, SP is a speaker, and MC is a microphone. The moving body 1 shown in FIG. 2 is a single-seat moving body, and an occupant P is seated in a driver's seat DS and wearing a seat belt SB. An arrow D1 is a traveling direction (a speed vector) of the moving body 1. The external detection device 10 is provided near a front end of the moving body 1, the internal camera 16 is provided at a position where an image of the head of the occupant P can be captured from a front of the occupant P, and the mode selector switch 22 is provided at a boss portion of the steering wheel WH. In addition, the external notification device 50 as a display device is provided near the front end of the moving body 1.

Returning to FIG. 1, the storage device 70 is, for example, a non-transitory storage device such as a hard disk drive (HDD), a flash memory, a random access memory (RAM). The storage device 70 stores navigation map information 72, a first trained model 73, a second trained model 74, and the like. Although the storage device 70 is shown outside a frame of the control device 100 in FIG. 1, the storage device 70 may be included in the control device 100. In addition, the storage device 70 may be provided on a server (not shown).

The navigation map information 72 is map information that is stored in advance in the storage device 70 and includes, for example, road center information including roadways and sidewalks, road boundary information, and the like. The navigation map information 72 further includes information (name, address, area, and the like) on facilities and buildings that are in contact with road boundaries.

The first trained model 73 is a trained model that is trained to use an image containing a road surface as an input and output areas estimated to have road surfaces with the same attribute in the image as one area. Here, the same attribute means, for example, a classification such as "sidewalk" or "lane (a left lane and a right lane)." The second trained model 74 is a trained model that is trained to use an image including a road surface as an input and output boundaries of a plurality of areas in the image. In the present invention, the first trained model 73 is a trained model generated by arbitrary unsupervised training, and the second trained model 74 is a trained model generated by arbitrary supervised training. By generating the first trained model 73 by unsupervised training without generating all the trained models used in the present invention by supervised training, it is possible to reduce training data preparation costs and a processing load of a CPU that executes training.

Figure 3:
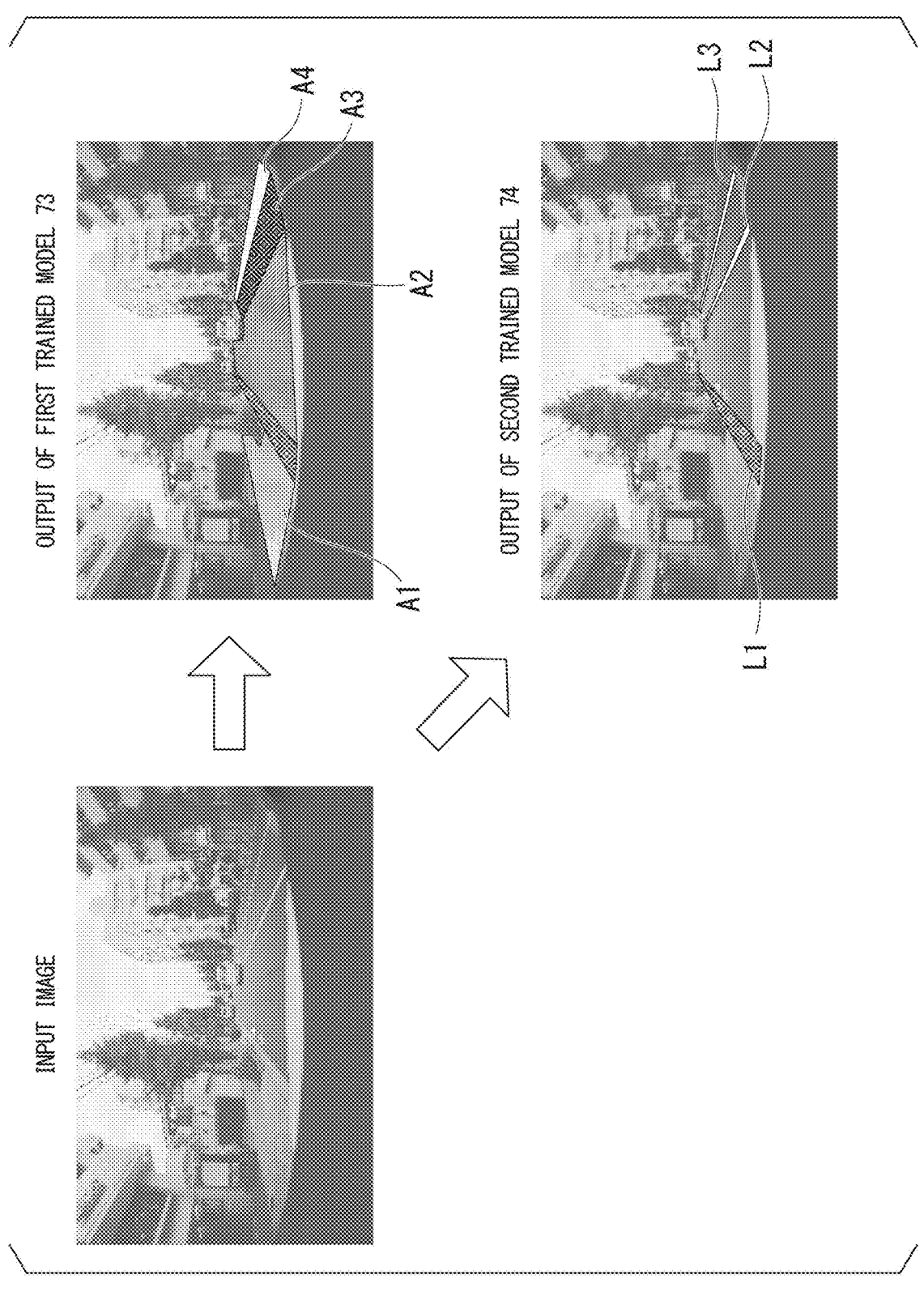
FIG. 3 is a diagram for describing a function of a first trained model and a second trained model.

FIG. 3 is a diagram for describing functions of the first trained model 73 and the second trained model 74. FIG. 3 shows examples of contents output from the first trained model 73 and the second trained model 74 in response to an input of the image including a road surface, respectively. In the case of FIG. 3, the first trained model 73 outputs an area A1 (a left sidewalk), an area A2 (a left lane), an area A3 (a right lane), and an area A4 (a right sidewalk) in the image according to the input of the image including a road surface. On the other hand, the second trained model 74 outputs boundaries L1, L2, and L3 between the areas in the image including a road surface according to the input of the image. As shown in FIG. 3, the "boundary" in this embodiment means a two-dimensional area that the moving body 1 can cross instead of a one-dimensional line. That is, teacher data used to generate the second trained model 74 is, for example, data defined by annotating an image with a boundary between areas as a two-dimensional area.

In general, a boundary of an area occupies a small proportion in area of an image, and an output accuracy of the boundary may decrease in a trained model that outputs an area and the boundary together. On the other hand, in the present invention, it is possible to improve the output accuracy of the boundary by separately providing a trained model that outputs an area and a trained model that outputs the boundary.

[Control Device]

The control device 100 includes, for example, a recognition unit 120, a reception unit 130, and a control unit 140. The recognition unit 120, the reception unit 130, and the control unit 140 are realized by, for example, a hardware processor such as a central processing unit (CPU) executing a program (software). Some or all of these components may be realized by hardware (a circuit unit; including circuitry) such as large scale integration (LSI), an application specific integrated circuit (ASIC), a field-programmable gate array (FPGA), and a graphics processing unit (GPU), or may also be realized by software and hardware in cooperation. The program may be stored in the storage device 70 in advance, or may be stored in a removable storage medium (a non-transitory storage medium) such as a DVD or CD-ROM and installed on the storage device 70 by the storage medium being mounted in a drive device. The storage device 70, the recognition unit 120, and the reception unit 130 are examples of the "image processing device," and the storage device 70, the recognition unit 120, the reception unit 130, and the control unit 140 are examples of a "moving body control device."

The recognition unit 120 recognizes objects present around the moving body 1 on the basis of an output of the external detection device 10. The objects include some or all of moving bodies such as vehicles, bicycles, and pedestrians, lane boundaries such as road division lines, steps, guardrails, road shoulders, and median strips, structures installed on a road such as road signs and billboards, and obstacles such as falling objects present (falling) on a lane.

The recognition unit 120 further inputs an image captured by an external camera of the external detection device 10 to the first trained model 73 and the second trained model 74 to acquire one or more areas and the boundaries in the image. The recognition unit 120 recognizes an area including a current location of the moving body 1 among the acquired areas as a travelable area on the basis of an installation position of the external camera in the moving body 1. For example, when the image shown in FIG. 3 is captured with the external camera provided in a center of the moving body 1, the recognition unit 120 determines that the area A2 positioned in a center of the image includes the current location of the moving body 1, and recognizes the area A2 as the travelable area. In addition, for example, the recognition unit 120 may recognize an area including coordinates positioned at a center of a horizontal axis and a bottommost part of a vertical axis of the captured image as the travelable area among the acquired areas.

Figure 4:
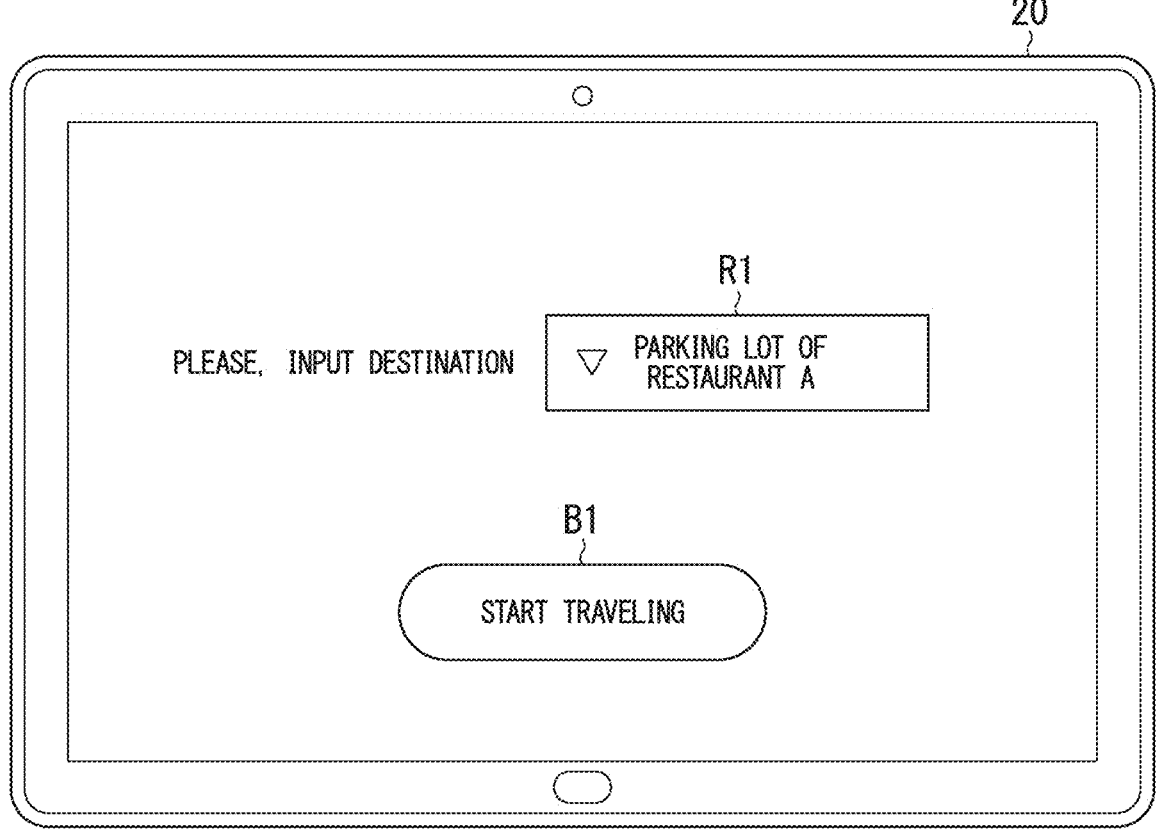
FIG. 4 is a diagram which shows an example of a destination of a moving body received by a reception unit.

The reception unit 130 receives setting of a destination of the moving body 1 via the HMI 20. FIG. 4 is a diagram which shows an example of the destination of the moving body 1 received by the reception unit 130. As shown in FIG. 4, the occupant of the moving body 1 sets the destination by, for example, inputting a name of the destination into an input area R1 provided on the HMI 20. In addition, for example, the HMI 20 may display the navigation map information 72, and the occupant of the moving body 1 may set the destination by designating a building or facility displayed in the navigation map information 72. Moreover, for example, the HMI 20 may be provided with an input area for inputting address information and telephone number, and the occupant of the moving body 1 may set a destination by inputting the address information and the telephone number.

Figure 5:
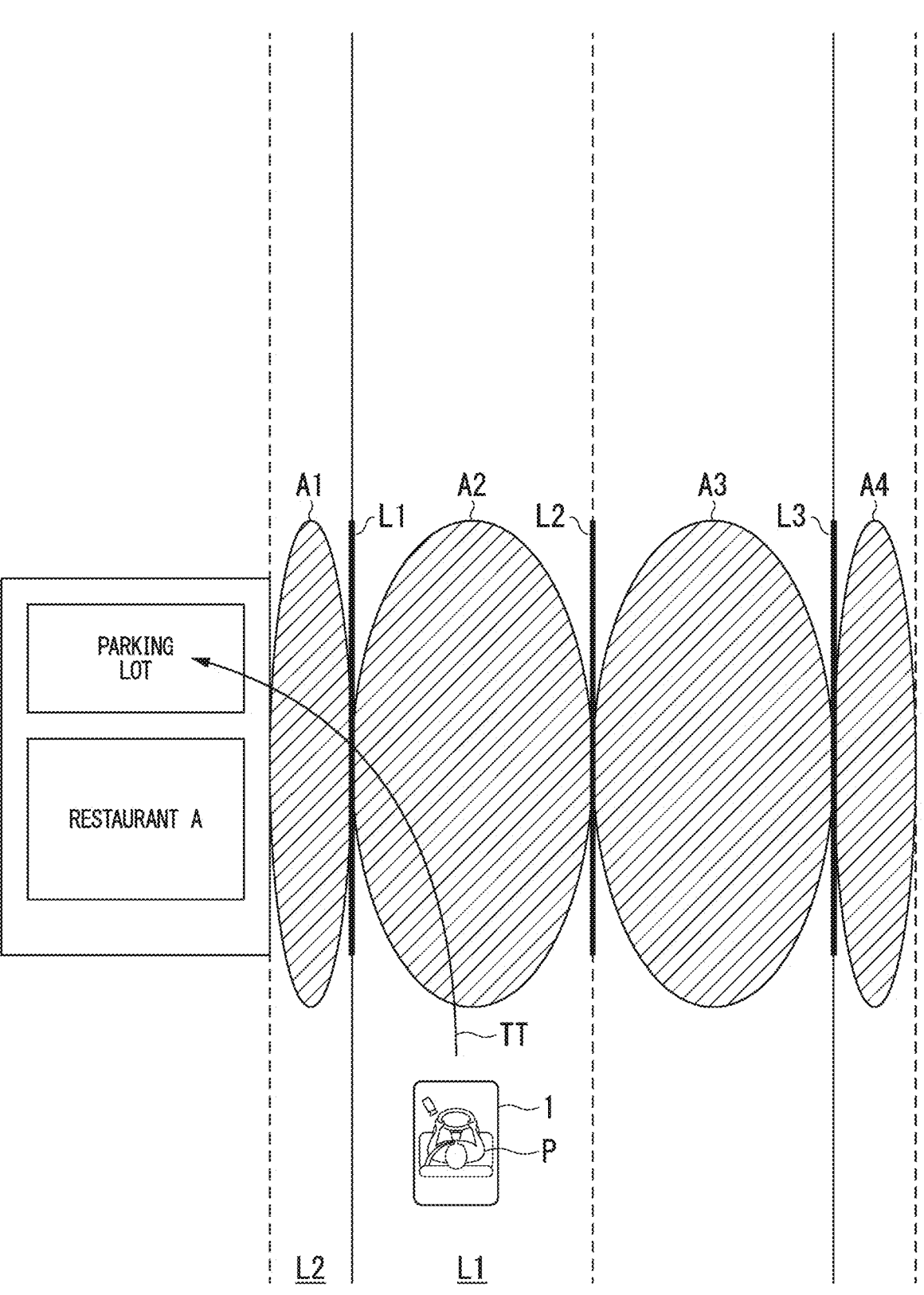
FIG. 5 is a diagram which shows an example of a target trajectory generated on the basis of a set destination.

When the occupant of the moving body 1 sets a destination and presses a travel start button B1, the control unit 140 refers to the navigation map information 72 and generates a target trajectory to the set destination. FIG. 5 is a diagram which shows an example of the target trajectory generated by the control unit 140 on the basis of the set destination. FIG. 5 shows the target trajectory generated by the control unit 140 on the basis of the destination set on the HMI 20 shown in FIG. 4. As shown in FIG. 5, a target trajectory TT generated by the control unit 140 extends from the current location of the moving body 1 to a parking lot of a restaurant A, and the target trajectory TT passes through the area A1 (corresponding to a sidewalk L2), the area A2 (corresponding to a roadway L1), and the boundary L1 between the area A1 and the area A2 output by the first trained model 73.

The area A1 is an area separated from the area A2, which includes the current location of the moving body 1, but, since it is on a route from the current location of the moving body 1 to the destination, it is assumed to be travelable by the moving body 1. For this reason, the recognition unit 120 recognizes the area A1 and the boundary L1 as a travelable area in addition to the area A2.

Figure 6:
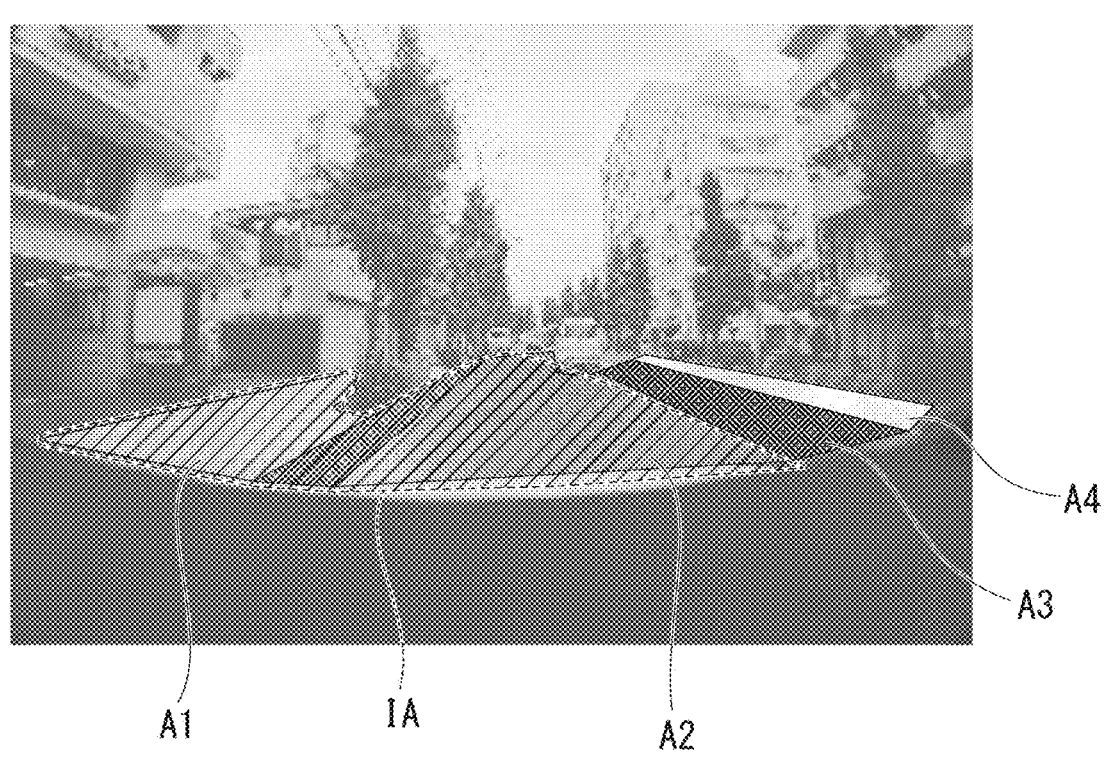
FIG. 6 is a diagram which shows an example of an integrated area acquired by a recognition unit.

When the recognition unit 120 recognizes the areas A1 and A2 and the boundary L1 as a travelable area, it acquires an integrated area by integrating these two areas and the boundaries and recognizes it as a travelable area. FIG. 6 is a diagram which shows an example of the integrated area acquired by the recognition unit 120. As shown in FIG. 6, the recognition unit 120 acquires an integrated area IA obtained by integrating the areas A1 and A2 and the boundary L1, and recognizes it as a travelable area. The control unit 140 controls the moving body 1 such that it travels in the travelable area recognized by the recognition unit 120, and causes it to travel to a destination.

The recognition of a travelable area described above is executed when the occupant sets a destination and the moving body 1 travels to the destination in an automated driving mode. When the moving body 1 travels in a manual driving mode, the recognition unit 120 may recognize an area into which the moving body 1 has entered by driving of the occupant as a travelable area. More specifically, when the moving body 1 has crossed a boundary and moved from the area including the current location to a different area, the recognition unit 120 may recognize the different area as the travelable area.

Furthermore, the travelable area recognized by the method described above may be stored in the navigation map information 72 in association with positional information measured by the positioning device 18. In that case, the control unit 140 may acquire the travelable area by referring to the navigation map information 72 when traveling on the same route next time, and cause the moving body 1 to travel in the travelable area without performing processing using the first trained model 73 and the second trained model 74 described above.

In this manner, to recognize the travelable area of the moving body 1, compared with a prior art in which it is necessary to change a trained model according to a type of a road on which the moving body 1 travels, the travelable area of the moving body can be recognized using the same trained model without depending on what kind of road the moving body 1 travels on according to the present invention. As a result, it is possible to recognize the travelable area without changing a trained model according to the type of a road on which the moving body travels.

Figure 7:
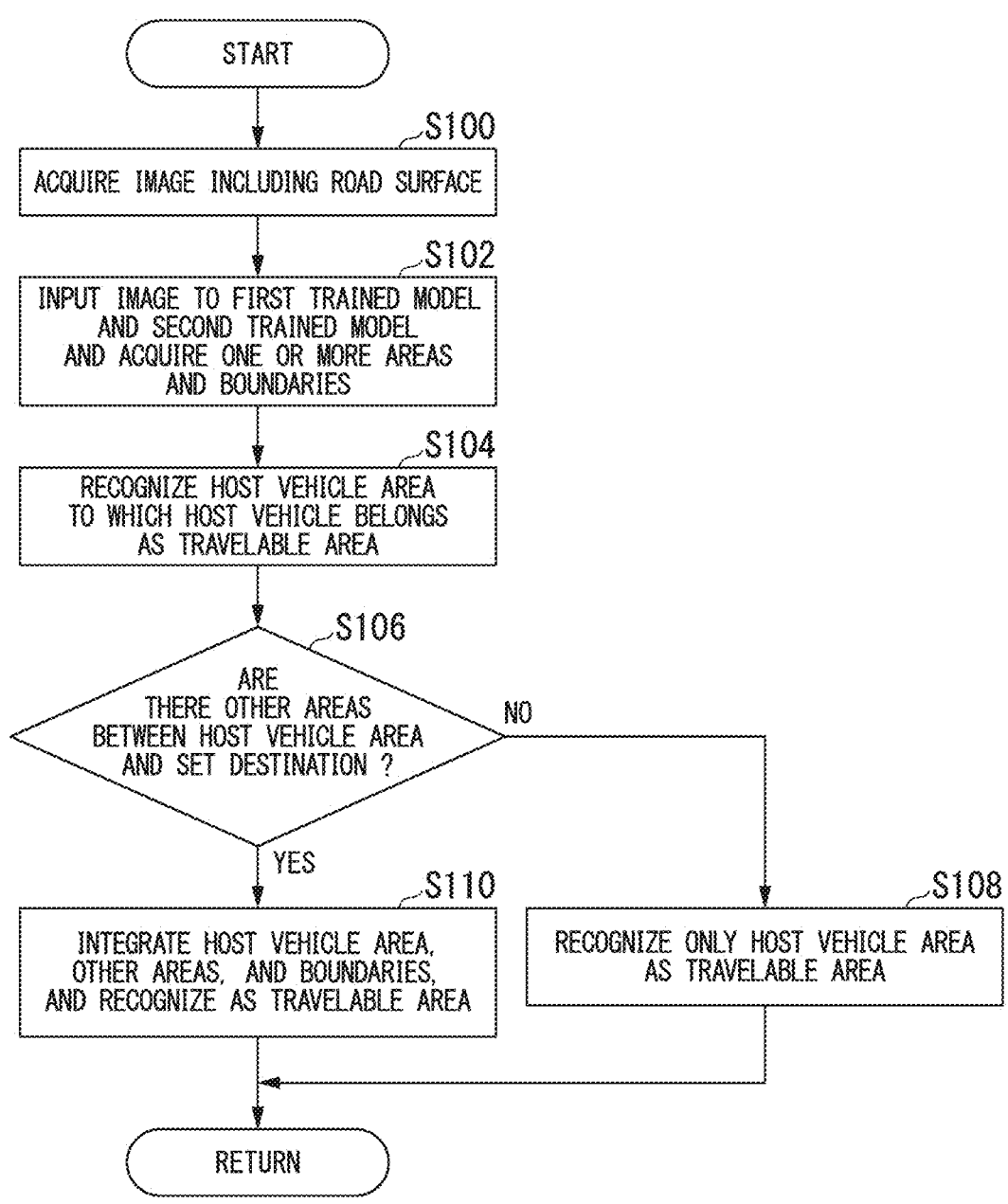
FIG. 7 is a diagram which shows an example of a flow of processing executed by an image processing device according to the embodiment.

Next, a flow of processing executed by the image processing device according to the embodiment will be described with reference to FIG. 7. FIG. 7 is a diagram which shows an example of the flow of processing executed by the image processing device according to the embodiment. The processing shown in FIG. 7 is repeatedly executed while the moving body 1 is traveling.

The recognition unit 120 first acquires an image which is captured by the external camera of the external detection device 10 and includes a road surface in front of the moving body 1 in the traveling direction (step S100). Next, the recognition unit 120 acquires one or more areas and the boundaries by inputting the acquired image into the first trained model 73 and the second trained model 74 (step S102).

Next, the recognition unit 120 recognizes a host vehicle area to which the moving body 1 belongs as a travelable area among areas output from the first trained model 73 (step S104). Next, the recognition unit 120 determines whether another area is present between a host vehicle area and the destination set via the HMI 20 (step S106).

When it is determined that there are no other areas between the host vehicle area and the set destination, the recognition unit 120 recognizes only the host vehicle area as a travelable area (step S108). On the other hand, when it is determined that there are other areas between the host vehicle area and the set destination, the recognition unit 120 integrates the host vehicle area, the other areas, and the boundaries, and recognizes a result of the integration as a travelable area (step S110).

Figure 8:
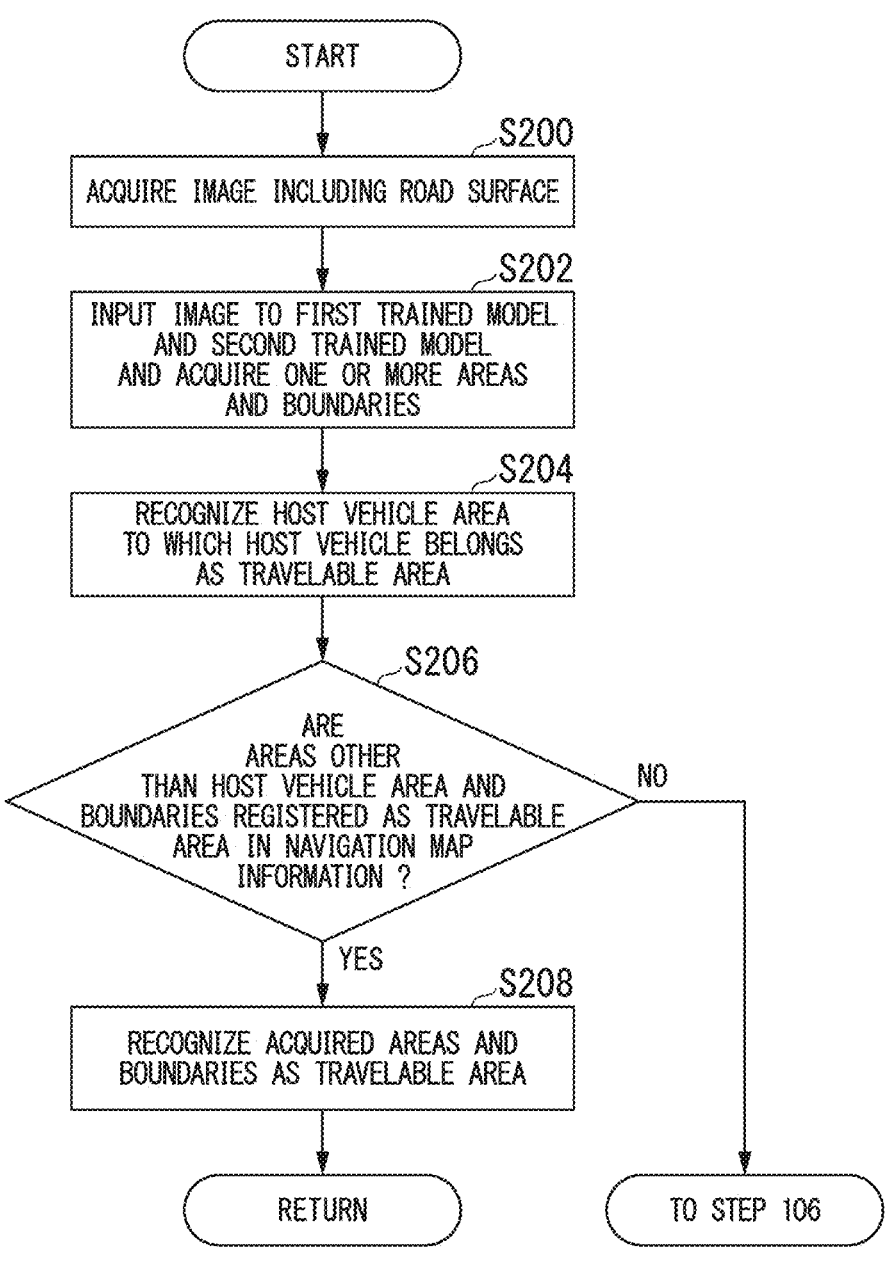
FIG. 8 is a diagram which shows another example of the flow of processing executed by the image processing device according to the embodiment.

FIG. 8 is a diagram which shows another example of the flow of processing executed by the image processing device according to the embodiment. The processing shown in FIG. 8 is repeatedly executed while the moving body 1 is traveling.

The recognition unit 120 first acquires an image which is captured by the external camera of the external detection device 10, and includes a road surface in front of the moving body 1 in the traveling direction (step S200). Next, the recognition unit 120 acquires one or more areas and the boundaries by inputting the acquired image into the first trained model 73 and the second trained model 74 (step S202). Next, the recognition unit 120 recognizes a host vehicle area to which the moving body 1 belongs as a travelable area among areas output from the first trained model 73 (step S204).

Next, the recognition unit 120 refers to the navigation map information 72 that stores the areas and the boundaries recognized as the travelable area in the past in association with the position information, and determines whether the acquired areas and boundaries are registered as a travelable area (step S206). When it is determined that the acquired areas and boundaries are not registered as the travelable area, the recognition unit 120 shifts processing to step S106 in FIG. 7. On the other hand, when it is determined that the acquired areas and boundaries are registered as the travelable area, the recognition unit 120 recognizes the acquired areas and boundaries as the travelable area (step S208). As a result, the processing of this flowchart will end.

According to the present embodiment described above, a travelable area in which a moving body can travel is recognized on the basis of areas and the boundaries obtained by inputting an image including a road surface, which is captured by a camera mounted on the moving body, into a first trained model and a second trained model. As a result, it is possible to recognize a travelable area without changing a trained model according to the type of a road on which the moving body travels.

The embodiment described above can be expressed as follows.

An image processing device includes a storage medium for storing computer-readable instructions, and a processor connected to the storage medium, in which the processor executes the computer-readable instructions to perform storing a first trained model, with an image including a road surface as an input, trained to output areas estimated to have road surfaces with the same attribute in the image as one area, and a second trained model, with an image including the road surface as an input, trained to output boundaries of a plurality of the areas in the image, and recognizing a travelable area in which a moving body is capable of traveling on the basis of the areas and the boundaries obtained by inputting an image including a road surface captured by a camera mounted in the moving body to the first trained model and the second trained model.

As described above, a mode for carrying out the present invention has been described using the embodiment, but the present invention is not limited to such an embodiment at all, and various modifications and replacements can be added within a range not departing from the gist of the present invention.

What is claimed is:

1. A moving body control device comprising:
a storage medium configured to store computer-readable instructions; and
a processor that is connected to the storage medium, wherein the processor executes the computer-readable instructions, thereby:
using a first trained model, which is trained to receive input of an image including a road surface to output areas estimated to have road surfaces with the same attribute in the image as one area, and a second trained model, which is trained to receive input of an image including the road surface as an input to output boundaries of a plurality of the areas in the image, and to recognize a travelable area in which a moving body is capable of traveling on the basis of the areas and the boundaries obtained by inputting an image including a road surface captured by a camera mounted in the moving body to the first trained model and the second trained model; and
causing the moving body to move in the travelable area by transmitting an instruction to a drive device so that the drive device outputs force to a drive wheel of the moving body.

2. The moving body control device according to claim 1, wherein the processor recognizes the area including a current location of the moving body as the travelable area.

3. The moving body control device according to claim 1, wherein the processor receives setting of a destination of the moving body, and
the processor, when the area separated from the moving body is present on a path from a current location of the moving body to the destination, recognizes the area and a boundary present between the area and the moving body as the travelable area.

4. The moving body control device according to claim 1, wherein the processor recognizes the area including a current location of the moving body as the travelable area,
the processor receives the setting of a destination of the moving body,
the processor, when a second area different from a first area including the current location of the moving body is present on a path from the current location of the moving body to the destination, recognizes the first area, the second area, and a boundary present between the first area and the second area as the travelable area, and
the first area and the second area are output by the first trained model, respectively.

5. The moving body control device according to claim 1, wherein, when the moving body crosses a boundary and moves to a different area from the area including a current location of the moving body, the processor recognizes the different area as the travelable area.

6. The moving body control device according to claim 1, wherein the first trained model is a trained model generated by unsupervised training, and the second trained model is a trained model generated by supervised training.

7. A moving body control method to be executed by a computer, the moving body control method comprising
using a first trained model, which is trained to receive input of an image including a road surface to output areas estimated to have road surfaces with the same attribute in the image as one area, and a second trained model, which is trained to receive input of an image including the road surface as an input to output boundaries of a plurality of the areas in the image, and to recognize a travelable area in which a moving body is capable of traveling on the basis of the areas and the boundaries obtained by inputting an image including a road surface captured by a camera mounted in the moving body to the first trained model and the second trained model; and
causing the moving body to move in the travelable area by transmitting an instruction to a drive device so that the drive device outputs force to a drive wheel of the moving body.

8. A computer-readable non-transitory storage medium that stores a program causing a computer to execute
using a first trained model, which is trained to receive input of an image including a road surface to output areas estimated to have road surfaces with the same attribute in the image as one area, and a second trained model, which is trained to receive input of an image including the road surface as an input to output boundaries of a plurality of the areas in the image, and to 5 recognize a travelable area in which a moving body is capable of traveling on the basis of the areas and the boundaries obtained by inputting an image including a road surface captured by a camera mounted in the moving body to the first trained model and the second 10 trained model; and causing the moving body to move in the travelable area by transmitting an instruction to a drive device so that the drive device outputs force to a drive wheel of the moving body. 15

\*     \*     \*     \*     \*